March 22, 1960 A. R. WAEHNER 2,929,409
REINFORCED TUBULAR SUPPORT MEMBERS
Filed March 21, 1957 2 Sheets-Sheet 1
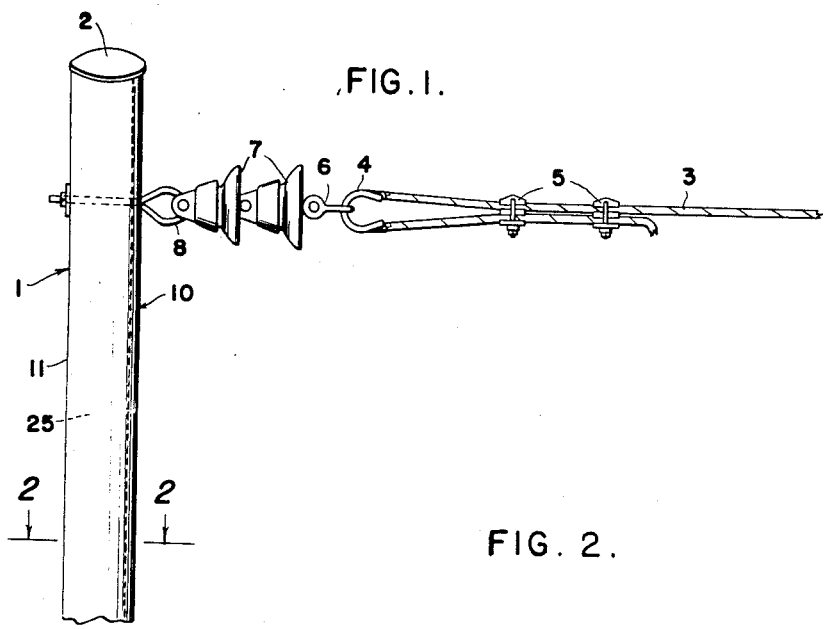
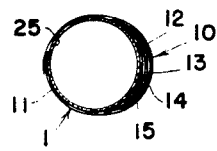
 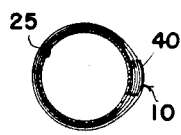
INVENTOR.
ALBERT R. WAEHNER
BY
ATTORNEY

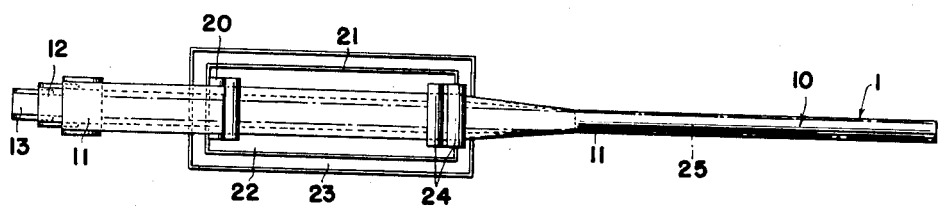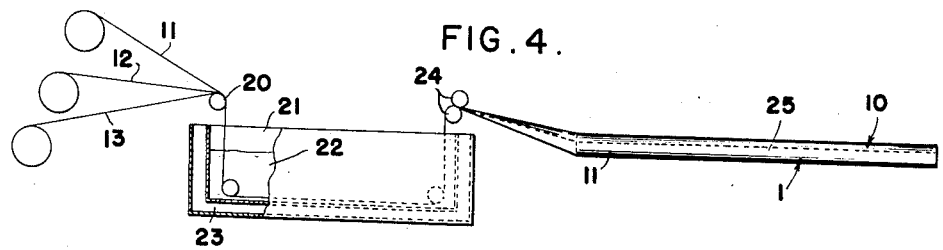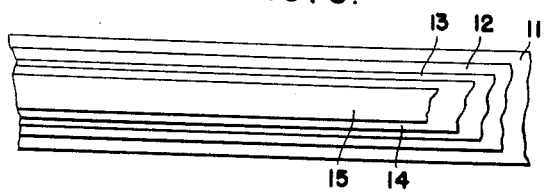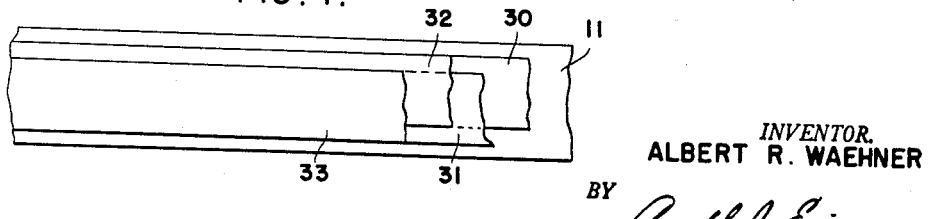

United States Patent Office 2,929,409
Patented Mar. 22, 1960

2,929,409

REINFORCED TUBULAR SUPPORT MEMBERS

Albert R. Waehner, Wauwatosa, Wis., assignor to McGraw-Edison Company, Milwaukee, Wis., a corporation of Delaware Application March 21, 1957, Serial No. 647,541

7 Claims. (Cl. 138—76)

The present invention relates to support members, and particularly to elongated tubular members fabricated from a plurality of laminated strip-like plies.

It is an object of the present invention to reinforce a tubular support member to withstand unbalanced transverse loading angularly relative to the longitudinal axis of said member.

It is another object of the present invention to provide a reinforcing means for a tubular support member subject to unbalanced transverse loading and taking the form of increased wall thickness at one or at opposed sides longitudinally of said support member and substantially in the plane of said loading.

It is a further object of the present invention to provide a reinforcing means for a tubular support member, wherein said member may be fabricated from a plurality of laminated strip-like plies cemented together in adjacent relationship relative to an elongate supporting mandrel.

It is a specific object of the present invention to provide a reinforcement for a tubular support member taking the form of various embodiments, wherein strip-like plies are wrapped and cemented together peripherally lengthwise of an elongate mandrel to provide a tubular finished member, and further wherein a plurality of said strips may, in one embodiment, be arranged adjacent one another prior to wrapping in stepped fashion with progressively wider strips being positioned laterally spaced from said mandrel, to permit a relatively thick wall section at one side or opposite sides longitudinally of said support member for purposes of adding strength for resisting unbalanced transverse loading.

It is still another object of the present invention to provide as another embodiment thereof, a reinforcing means for a tubular support member, wherein strip-like plies are laid lengthwise relative to the longitudinal axis of an elongate mandrel and are cemented relative to one another with a reinforcing lapped portion being provided at the longitudinal seam of said member.

A still further object of the present invention is to provide, as still another embodiment, a reinforcing means for a tubular support member formed from strip-like plies being laid lengthwise relative to longitudinal axis of an elongate mandrel and being alternately laterally shifted relative to one another and to said axis to provide relatively thicker wall portion at one side of said tubular member when cemented together on said mandrel.

For a better understanding of the nature and objects of the invention, reference should be had to the following detailed description and drawings in which:

Fig. 1 is an elevational view depicting a tubular support member used as a dead end support at the termination of an electric line, and made in accordance with the present invention.

Fig. 2 is a cross sectional view taken on lines 2—2 of Fig. 1.

Fig. 3 is a top plan view of certain apparatus used in the formation of tubular support members in accordance with the present invention.

Fig. 4 is a side elevational view of the apparatus shown in Fig. 3.

Fig. 5 is a fragmentary view of one embodiment of the present invention, showing the constituent elements assembled in accordance with the present invention.

Fig. 6 is a plan fragmentary view of various strip-like plies of material, such as fiber-glass in position prior to being assembled peripherally of a mandrel.

Fig. 7 is another embodiment of the present invention in plan fragmentary view indicating an arrangement of strip-like plies prior to assembly and cementing.

Fig. 8 is a sectional view taken on a support member at a location approximating that of Fig. 2, wherein still another embodiment is illustrated with reinforcement being applied to opposed sides thereof.

Fig. 9 represents still another embodiment of the present invention shown in cross section, taken at approximately the same position as the section of Fig. 2 and indicating an overlap arrangement of laminations.

Very recently tubular support members, such as power and communication line supporting poles and crossarms have been introduced in the form of laminated fiber-glass material wrapped about a mandrel and cemented relative to one another to provide a tubular column. These members have various advantages over conventional wood poles, especially in longevity and in less weight for ease in handling, in addition to the fact that they are practically resistant to attack by woodpeckers and other objects which tend to destroy wood poles.

This leads to the present problem, which is directed to the provision of tubular support members for use as dead end poles where there may be physical obstructions or where it may be impossible to obtain an easement from an adjacent property owner for positioning tensioned guy members to counteract the transverse forces applied to the free end of the poles. As presently provided, tubular poles are manufactured with a relatively heavy wall thickness to compensate for lack of guying. Obviously, this materially adds to the cost of the member, and also provides a pole that, from outward appearances, appears to be relatively clumsy and over-dimensioned for its application.

It has been found that the fiber-glass material used in tubular poles is relatively strong in tension, but tends to be weak in compression. This will obviously be represented in a pole subjected to transverse loading by corrugations on the side nearest the application of the load, which side will be under compression during bending. The corrugations will tend to weaken the pole and negate all of the beneficial results provided by the additional tensile strength factor.

In addition, fiber-glass members have considerable deflection under load, which, although unimportant as far as strength is concerned, becomes of considerable importance when poles manufactured therefrom are used to support heavy street light luminaires and when used for dead-ending, especially at junction supports for intersecting lines. In street lighting it is important to maintain precise light distribution without requiring undue compensation for pole tilt or rake. It will also be apparent that a corner dead-end pole should be free from deflection to prevent unbalanced stretch or sag on one or both of the laterally extending lines attached thereto.

Therefore, the present invention contemplates a physical addition at least to the compression side and preferably to opposed sides of the pole for the certain poles that are required infrequently for use as dead end members or street light standards having no means of including guy attachments.

It will be apparent from Figs. 1 and 2 that a dead-end pole member 1 is provided of tubular construction and preferably having a closure cap 2 at its top end. An electric line 3, is attached in the usual manner to the upper end of the pole, and by means of looping around a guy thimble 4 and being fastened back upon itself with spaced apart dead-end clamps 5. The thimble 4 is held in place by means of an anchor shackle 6 secured to a string of suspension insulators 7. The opposite end of the insulators are fastened to the eyelet of a conventional eye bolt 8, which is preferably secured to the pole by means such as that disclosed in the copending application of Clifford W. Petersen for Supporting Attachment, bearing Serial No. 641,551, filed on February 21, 1957, now Patent No. 2,858,153, and assigned to the same assignee as is the present invention. The copending patent application relates to a preferred means of assembling attaching devices to tubular support members, whereby collapse of the relatively thin wall surface under lateral strain is prevented.

It will be apparent from the illustration of Fig. 1 that the pole 1 is provided with a reinforcing portion substantially coextensive with its length. The portion is indicated generally by the reference numeral 10, and as shown, is at the side facing the unbalanced transverse load exerted by the line 3. The cross-sectional view of Fig. 2, as well as the views of Figs. 3–6, inclusive, is illustrative of one embodiment of the present invention providing the added reinforcing means. In this particular embodiment, the tubular support member or pole 1 is fabricated from a series of elongated strip-like plies of woven fiber-glass material arranged in stepped fashion with progressively wider strips being disposed laterally relative to the longitudinal axis of the pole, with the outermost strip 11 (see Figs. 5 and 6) acting to enclose the remaining interleaved members. As shown in Figs. 3 and 4, a convenient method of fabricating poles utilizes a series of rolls of strip-like material 11, 12 and 13, including additional rolls, if so desired, for an additional number of laminae. The strips are arranged relative to one another in stepped laminated arrangement upon a guide roll 20 and are directed into a vat 21 containing a resin-like cement or adhesive 22, such as the conventional epoxy resins, polyester resins, or melamine, or if so desired, an alkyd resin may be used. It is conventional to provide a vat 21 in the form of a double-walled vessel, wherein the outer chamber 23 contains a fluid heating medium. On passing through the adhesive, the strips are wiped between rolls 24 to remove excess adhesive. The elongated strips are then pulled longitudinally relative to a previously prepared, resin impregnated paper mandrel 25 to be wrapped circumferentially coextensive of its length. This wrapping practice is conventional and well-known in the manufacture of tubular poles. Obviously, if so desired, it is within the province of this invention to provide a reinforcing portion for spirally wrapped tubular members (not shown). This may be done by inserting relatively narrow strips towards the interior of the member prior to spiral wrapping.

The formed member is then cut to the desired length and overwrapped with cellophane, or the like, prior to being cured at a desired temperature for a predetermined length of time. The curing cycle is well-known for the various resin reinforced fiber-glass materials.

Another embodiment of the present invention is disclosed in Fig. 7, wherein an outer wrap 11 is used with alternatively shifted plies 30, 31, 32 and 33 of lesser width, to provide a relatively thick reinforcing portion 10. The inner plies of this embodiment are preferably of the same width, but are shifted in alternate fashion about a common plane substantially normal to the longitudinal axis of each strip.

The illustration of Fig. 8 provides two reinforced portions 10 at diametrically opposed sides of a tubular support member wound about a mandrel 25. Obviously, it is not essential that the reinforcements be at opposed sides of the member, but this is preferential for purposes of reducing deflection, as will hereinafter be described. In the embodiment of Fig. 9, two sets of progressively wider strips, similar to those shown in Fig. 6 are applied to opposite sides of the mandrel 25 in a similar manner as shown in Figs. 3 and 4. Thus, in this embodiment, an additional reinforcement is provided which has been found to be quite a factor in minimizing deflection in the finished support. Although the members when manufactured from fiber-glass, are comparatively strong in tension, they have been found to deflect considerably when subjected to lateral loading. It has been found that the additional reinforcement, positioned preferably at the sector opposite from the load will materially reduce this deflection.

An overlap arrangement is shown in the cross-section of Fig. 9 in which a series of fiber-glass laminations 40 are wound concentrically of a mandrel 25 and are provided with a substantial overlap to provide the reinforcement section 10 at one side of the tubular support member. This is perhaps the most convenient embodiment to manufacture, but does have the limitation of being applicable to one side only of the finished member.

I claim:

1. The method of manufacturing an elongated tubular support member which comprises forming a tubular column of predetermined length upon a cylindrical mandrel from a plurality of strip-like plies of flexible sheet material which are of varying width and at least one of which is of a width less than the circumference of said mandrel, said plies having been previously immersed in a fluid cementing composition, arranging said plies to provide a predetermined wall section of relative increased thickness longitudinally of said column, and hardening said cementing composition to produce the finished support member.

2. The method of manufacturing an elongated tubular support member which comprises forming a tubular column of predetermined length upon a cylindrical mandrel from a plurality of longitudinally arranged strip-like plies of flexible sheet material which have been previously immersed in a fluid cementing composition, arranging said plies in stepped relationship relative to one another with progressively narrower strips being positioned towards said mandrel to provide a predetermined wall section of increased thickness longitudinally of said column, and hardening said cementing composition to produce the finished support member.

3. The method of manufacturing an elongated tubular support member which comprises forming a tubular column of predetermined length upon a cylindrical mandrel from a plurality of longitudinally arranged strip-like plies of flexible sheet material of varying width and at least one of said plies having a width less than the circumference of said mandrel, said plies having been previously immersed in a fluid cementing composition, arranging said plies in overlap relationship longitudinally of said column to provide a predetermined wall section of relative increased thickness longitudinally of said column, and hardening said cementing composition to produce the finished support member.

4. The method of manufacturing an elongated tubular support member which comprises forming a tubular column of predetermined length upon a cylindrical mandrel from a plurality of longitudinally arranged strip-like plies of flexible sheet material which have been previously immersed in a fluid cementing composition, arranging said plies relative to one another in alternating staggered relationship relative to a common longitudinal plane normal thereto to provide a predetermined wall section of relative increased thickness longitudinally of said column, and hardening said cementing composition to produce the finished support member.

5. A tubular support member for supporting a load transversely of its longitudinal axis comprising a plurality of curvilinear laminae forming an elongated rigid tube, and elongated strengthening means interposed between individual laminae in one coextensive longitudinal segmented portion of said tube to provide a tube having a thickened dimension portion affording increased strength to compression forces applied transversely thereto.

6. A tubular support member for supporting a load transversely of its longitudinal axis comprising a plurality of curvilinear laminae forming an elongated rigid tube, and elongated strengthening means comprising stacked elongated strips interposed between individual laminae in one coextensive longitudinal segmented portion of said tube to provide a tube having a thickened dimension portion affording increased strength to compression forces applied transversely thereto.

7. A tubular support member for supporting a load transversely of its longitudinal axis comprising a plurality of curvilinear laminae forming an elongated rigid tube, and elongated strengthening means comprising a plurality of elongated strips all of generally arcuate cross section and varying width, each individual strip being interposed between individual laminae in one coextensive longitudinal segmented portion of said tube to provide a tube having a thickened dimension portion affording increased strength to compression forces applied transversely thereto.

References Cited in the file of this patent

UNITED STATES PATENTS

| | | |
|---|---|---|
| Re. 23,317 | Greenwald | Jan. 2, 1951 |
| 28,432 | Alden | May 22, 1860 |
| 148,428 | Dodge | Mar. 10, 1874 |
| 2,176,109 | Ratay | Oct. 17, 1939 |